United States Patent [19]
Braun et al.

[11] Patent Number: 6,042,642
[45] Date of Patent: Mar. 28, 2000

[54] IRON OXIDE YELLOW PIGMENTS, A METHOD OF PRODUCING IRON OXIDE YELLOW PIGMENTS AND THE USE THEREOF

[75] Inventors: Rolf-Michael Braun; Eckhard Bayer; Ulrich Meisen, all of Krefeld, Germany

[73] Assignee: Bayer AG, Leverkusen, Germany

[21] Appl. No.: 09/173,301

[22] Filed: Oct. 15, 1998

[30] Foreign Application Priority Data

Oct. 20, 1997 [DE] Germany .......................... 197 46 263

[51] Int. Cl.[7] .................................................. C01G 49/02
[52] U.S. Cl. .......................... 106/456; 106/459; 106/712; 423/632
[58] Field of Search ............................ 423/632; 106/456, 106/459, 712

[56] References Cited

U.S. PATENT DOCUMENTS 4,321,249  3/1982  Gavogiannis .

FOREIGN PATENT DOCUMENTS 1031786  7/1989  China .
0 704 498  4/1996  European Pat. Off. .

OTHER PUBLICATIONS

Chemical Abstracts, vol. 113, No. 6, abstract 44190, Aug. 6, 1990. (See AJ).

*Ullmann'Encyclopedia of Industrial Chemistry*, Photography of Plastics, Processing, Fifth Complete Revised Edition, vol. A 20, pp. 297–304, no date.

*Primary Examiner*—C. Melissa Koslow
*Attorney, Agent, or Firm*—Connolly Bove Lodge & Hutz LLP

[57] ABSTRACT

The present invention relates to iron oxide yellow pigments, to a method of producing iron oxide yellow pigments by a precipitation method from iron(II) chloride and an alkaline component, and to the use thereof.

15 Claims, No Drawings

IRON OXIDE YELLOW PIGMENTS, A METHOD OF PRODUCING IRON OXIDE YELLOW PIGMENTS AND THE USE THEREOF

The present invention relates to iron oxide yellow pigments, to a method of producing iron oxide yellow pigments by a precipitation method from iron(II) chloride and an alkaline component, and to the use thereof.

Precipitation methods for the production of iron oxide yellow pigments have long been known. The typical course of this method is described, for example, in Ullmanns Enzyklopädie der technischen Chemie, Edition 5, Volume A20. pages 297 et seq. Iron(II) sulphate which is formed during the pickling of steel sheets, or iron(II) sulphate which is formed during the production of titanium dioxide by the sulphate process, are usually employed as the raw material.

Large amounts of $FeCl_2$ are formed during the production of synthetic rutile for the manufacture of $TiO_2$. An increasing trend towards the use of hydrochloric acid as a pickling agent has been observed for some years, so that large amounts of $FeCl_2$ are also formed here. Moreover, what is termed the chloride process is being increasingly used world-wide for the production of titanium dioxide. Solutions containing iron(II) chloride are therefore increasingly being formed by these processes, and should be converted if possible into a valuable material.

One common process for the utilisation of waste $FeCl_2$ solutions is the spray-roasting process, in which iron(II) chloride or iron(III) chloride is subjected to oxidative hydrolysis at high temperatures (typically at temperatures higher than 1000° C.). The final products formed here are iron oxides, typically haematite, and hydrochloric acid, which can also be recycled as a valuable material, e.g. to the pickling plant process.

An iron oxide is obtained here, without special purification steps, which as a rule is suitable for the production of hard ferrites. If soft ferrites are produced from iron oxides obtained in this manner, the iron chloride solution which is used has to be subjected beforehand to additional purification operations, due to which the process becomes considerably more expensive. Since increasing amounts of iron chloride are being formed, most of which is of low quality, and the absorption capacity of the ferrite market is restricted, an alternative is being sought for the production of a valuable substance from iron chlorides obtained in this manner. Direct landfill dumping or ocean dumping of these iron chloride solutions is not possible for environmental reasons.

The object of the present invention was therefore to provide a method which enables iron chloride solutions to be converted into high-grade valuable substances in an inexpensive manner which is as simple as possible.

It has proved possible to achieve this object by the iron oxide yellow pigments according to the invention and by the method according to the invention.

The present invention therefore relates to iron oxide yellow pigments with a brightness L* as the full shade of 62.0 to 64.0 CIELAB units, an a* value of 8.5 to 10.5 CIELAB units, a b* value of 48.5 to 50.5 CIELAB units. a brightness L* when whitened of 81.6 to 82.5 CIELAB units, an a* value of 3.8 to 4.8 CIELAB units, a b* value of 37.5 to 39.5 CIELAB units, a chromium content of less than 40 mg/kg iron oxide yellow pigment, a chloride content between 0.05 % and 0.3% by weight relative to iron oxide yellow pigment, and a manganese content of 0.007 to 0.055 % by weight relative to iron oxide yellow pigment.

The present invention further relates to a method of producing iron oxide yellow pigments by a precipitation method, characterised in that a) an alkaline component is added to an acidic Fe(II) chloride solution with an $FeCl_2$ content of 50 to 450 g/l, with intensive stirring and in an amount which is sufficient to adjust the pH of the solution to between 3 and 5.

b) a flocculant is optionally added in addition to the solution, before or after the addition of the alkaline component or together with the alkaline component, c) oxidation is optionally effected after the addition of the alkaline component and of the flocculant which is optionally added, d) the solid formed after treatment as in a) to c) is separated from the solution, e) the solution formed in d) is added to a suspension of α-FeOOH nuclei prepared by a precipitation method, in an amount which corresponds to 4- to 8 times the molar amount of iron of the total suspension of nuclei (namely iron from iron oxide-hydroxide and iron from an unreacted iron compound), f) the suspension obtained as in e) is heated to a temperature of 30 to 95° C., preferably 30 to 85° C., most preferably 55 to 75° C. with good mixing throughout, g) oxidation is subsequently effected with an oxidising agent, wherein the oxidising agent is added so that 0.5 to 10 mole % iron per hour, preferably 0.5 to 2.0 mole % iron per hour, is oxidised, and the pH is simultaneously increased, with an alkaline component, at a rate of 0.01 to 0.4 pH units/hour, to a final pH of 3.0 to 5.0, h) further oxidation is optionally effected at a constant pH between 3 0 and 5.0, i) oxidation is terminated as soon as the Fe(II) content of the suspension is less than 1 mole %, j) the solid from i) is finally separated, washed, dried and ground.

Sodium hydroxide solution, sodium carbonate, magnesium carbonate, magnesium oxide, magnesium hydroxide, calcium oxide, calcium hydroxide or ammonia are preferably used as the alkaline component.

Iron(II) chloride solutions from the pickling of steel, or iron(II) chloride solutions from the production of $TiO_2$ by the chloride process can be used.

The method according to the invention can advantageously be carried out as follows:

an amount of sodium hydroxide solution such that a pH from 3 to 5 is obtained is added to an iron(II) chloride solution with an $FeCl_2$ content between 50 and 450 g/l, with intensive stirring. Another alkaline component, such as $Ca(OH)_2$, $Na_2CO_3$ or ammonia, etc., can also be used instead of sodium hydroxide solution. Moreover, the sedimentation behaviour of the hydroxide or carbonate sludge which is obtained can be improved by the addition of a flocculant. Known flocculants, such as polyacrylates or other substances with a similar effect, can be used for example. Subsequent oxidation can optionally be effected in addition in order to improve the settling behaviour. This can also result in various metal cations being converted into oxides or hydroxides of higher valency, which can be separated more easily.

Separation of the hydroxide or carbonate sludge formed can be effected by sedimentation, filtration or by separation using a separator. The optimum choice of suitable apparatus or of a suitable method depends on the precise test conditions, on the mass flows and on the raw materials used.

The iron(II) chloride solution prepared as above is added, in an amount which corresponds to 4- to 8-times the molar amount of iron of the total nucleant material, to a suspension of α-FeOOH nuclei which is prepared by a precipitation method and in which the nuclei have a BET specific surface of 65 m$^2$/g for example (namely iron from iron oxide-hydroxide and iron from an unreacted iron compound). The suspension which is obtained is heated, preferably with stirring, to a temperature of 30 to 95° C., preferably 30 to 85° C., most preferably 55 to 75° C. After this temperature is reached, oxidation is effected with an oxidising agent, and the pH is simultaneously increased at a rate of 0.01 to 0.4 pH units/hour, to a final pH of 3.0 to 5.0. The rate of oxidation, which depends on the rate of addition of the oxidising agent, on the temperature, on the mixing throughout in the vessel and on the pH, should preferably be between 0.5 and 10 mole % iron per hour, most preferably between 0.5 mole % and 2.0 mole % iron per hour. If the oxidation rate is considerably below the upper limit, the method becomes uneconomic, if the oxidation rate is significantly above the upper limit, an iron oxide yellow pigment with an unwanted red cast is obtained.

Work-up of the pigment suspension is effected by the known steps of filtration, drying and grinding.

The following can be used as oxidising agents, for example:

atmospheric oxygen pure oxygen ozone $H_2O_2$ sodium hypochlorite, bleach liquor or calcium hypochlorite chlorites or chlorates perchlorates nitrates chlorine.

Oxidation is preferably terminated as soon as the Fe(II) content of the suspension is less than 1 mole %. Further oxidation can also be effected, until complete reaction is achieved.

Apart from the use of iron(II) chloride solutions, mixtures of iron(II) chloride and iron(II) sulphate solutions can also be used, both for the production of nuclei and for the production of pigment. The preferred embodiment is the exclusive use of iron(II) chloride solutions. Iron(II) chlorides which are formed during the production of $TiO_2$ by the chloride process can also be used, for example, such as those which have previously been reduced to iron(II) chloride with metallic iron.

The iron oxide yellow pigments which are obtained are particularly suitable for the coloration of plastics and paper and for the production of colorant preparations such as latex paints, lacquers and dyes. They can be used for the coloration of building materials. They are also suitable for the production of colouring agents for the food industry.

Unless stated otherwise, the parts and percentages in the following examples are given as parts and percentages by weight.

The colour shade was determined by the procedure specified below.

1. Preparation in an Alkyd Resin Lacquer in Order to Measure the Full Shade

Amounts of pigments weighed in:

Fe red (haematite) 1.00 g

Fe yellow (goethite) 0.80 g

Fe black (magnetite) 1.00 g.

The pigment was prepared in a disc colour grinding machine (mill), in a non-drying test binder vehicle. The test binder vehicle (paste) consisted of two components.

Component 1:

Component 1 was an alkyd resin binder vehicle based on linseed oil and phthalic anhydride. It corresponded to the specifications which are given in the Standards DIN EN ISO 787-24 (October 1995), ISO 787-25:1993 and DIN 55983 (December 1983) as requirements for a test binder vehicle for colouring pigments. The product used was SACOLYD® L 640 (Krems Chemie), formerly ALKYDALX®L 64 (Bayer AG).

Component 2:

Component 2 was a rheological additive which was added to ensure thixotropic behaviour of the paste. The additive employed here was a modified hydrogenated castor oil in powder form, LUVOTHIX® HT (Lehmann & Voss & Co.) in a concentration of 5.0 %.

The LUVOTHIX HT was dissolved in the SACOLYD L 640 at 75 to 95° C. The cooled, compact mass was passed once through a three-roller mill. With this step, the paste was complete.

A disc colour grinding machine (mill) was used, as described in DIN EN ISO 8780-5 (April 1995). An ENGELSMANN JEL 25/53 mill was employed which had an effective disc diameter of 24 cm. The speed of rotation of the lower disc was about 75 min$^{-1}$. The force between the discs was set at about 0.5 kN by suspending a 2.5 kg loading weight on the loading stirrup. The aforementioned amount of pigment and 5.00 g paste were dispersed in three steps of 25 revolutions each, by the procedure described in DIN EN ISO 8780-5 (April 1995) Section 8.1.

The pigment-paste mixture was subsequently spread into a paste tray, the function of which corresponded to that of the paste tray in DIN 55983 (December 1983). The doctor blade forming part of the paste tray was drawn over the hollow in the tray which was filled with the pigment-paste mixture so that a smooth surface was produced. In the course of this procedure, the doctor blade was moved in one direction at a speed of about 3 to 7 cm/sec. The smooth surface was measured within a few minutes.

2. Whitening (Depth of Colour)

The pigment was prepared in a disc colour grinding machine (mill), in a non-drying test binder vehicle. The test binder vehicle (paste) consisted of two components.

Component 1:

Component 1 was an alkyd resin binder vehicle based on linseed oil and phthalic anhydride. It corresponded to the specifications which are given in the Standards DIN EN ISO 787-24 (October 1995). ISO 787-25:1993 and DIN 55983 (December 1983) as requirements for a test binder vehicle for colouring pigments. The product used was SACOLYD L 640.

Component 2:

Component 2 was a rheological additive which was added to ensure thixotropic behaviour of the paste. The additive employed here was a modified hydrogenated castor oil in powder form, LUVOTHIX HT, in a concentration of 5.0 %.

The LUVOTHIX HT was dissolved in the SACOLYD L 640 at 75 to 95° C. The cooled, compact mass was passed once through a three-roller mill. With this step, the paste was complete.

A disc colour grinding machine (mill) was used, as described in DIN EN ISO 8780-5 (April 1995). An ENGELSMANN JEL 25/53 mill was employed which had an effective disc diameter of 24 cm. The speed of rotation of the lower disc was about 75 min$^{-1}$. The force between the discs was set at about 0.5 kN by suspending a 2.5 kg loading weight on the loading stirrup.

A commercially available titanium dioxide pigment, BAYERTITAN®R-KB-2 (Bayer AG), was used as the whitening agent. The composition of R-KB-2 corresponds to that of Type R 2 in ISO 591-1977. If another R 2 pigment is used instead of R-KB-2, CIELAB coordinates which differ during the colour measurement may be obtained.

0.400 g pigment, 2.000 g BAYERTITAN R-KB-2 and 3.00 g paste were dispersed in 5 steps of 25 revolutions each, by the procedure described in DIN EN ISO 8780-5 (April 1995) Section 8.1.

The pigment-paste mixture was subsequently spread into a paste tray the function of which corresponded to that of the paste tray in DIN 55983 (December 1983). The doctor blade forming part of the paste tray was drawn over the hollow in the tray which was filled with the pigment-paste mixture so that a smooth surface was produced. In the course of this procedure, the doctor blade was moved in one direction at a speed of about 3 to 7 cm/sec. The smooth surface was measured within a few minutes.

3. Colorimeter

A spectrophotometer ("colorimeter") was used which had d/8 measuring geometry without a gloss trap. This measuring geometry is described in ISO 7724/2-1984 (E), Item 4.1.1. in DIN 5033, Part 7 (July 1983) Item 3.2.4 and in DIN 53236 (January 1983), Item 7.1.1.

A DATAFLASH 200 measuring instrument supplied by Datacolor International was used.

The colorimeter was calibrated against a white ceramic working standard, as described in ISO 7724/2-1984 (E). Item 8.3. The reflection data of the working standard in relation to an ideal matt white body were stored in the measuring instrument, so that after calibration with the white working standard all the colour measurements were obtained with respect to the ideal matt white body. Black point calibration was effected using a black hollow body supplied by the manufacturer of the colorimeter.

4. Colour Measurement

Any gloss trap present was disconnected. The temperature of the calorimeter and of the test specimen was about 25° C.±5° C.

4.1 Measurement of the Lacquer Coat

The coat was placed on the colorimeter so that the measuring aperture covered a central point on the lacquer coat. The coat had to be completely contiguous all over. The measuring aperture had to be completely covered by the lacquer coat. The measurement was then made.

4.2 Measurement of the Paste Tray

The colour measurement was made immediately after spreading into the paste tray had been effected. The filled paste tray was placed on the calorimeter so that the measurement aperture was completely filled by the hollow in the tray which was coated with paste. The tray had to be completely contiguous all over. The measurement was then made.

5. Calculation of the CIE Coordinates

The CIE 1976 (L*, a*, b*) coordinates (abbreviated to CIELAB) of a reflection spectrum are dependent on the boundary conditions selected for the measurement and evaluation. The data given for the wavelength range from 400 nm to 700 nm and the interval of 20 nm are applicable to the Dataflash 2000 colorimeters used at that time (situation as of July, 1997).

Only the coordinates L*, a* and b* are given. All other quantities are redundant.

The CIE coordinates L*, a* and b* of 1976 were calculated from the measured reflection spectrum in accordance with the calculation instructions given in ASTM E 308-1985, Item 7. The standard light type C and 2° normal observer weighting functions of 1931 in ASTM E 308-1985. Table 5.6. were used. The wavelength range was between 400 nm and 700 nm. The wavelength interval was 20 nm. No gloss was deducted by calculation. The L*, a* and b* results were rounded to whole numbers.

The CIE coordinates are cited in DIN 5033 part 3 (July 1992) as the coordinates of the L*a*b* colour solid. The abbreviation CIELAB colour solid is introduced in ISO 7724/3-1984. The coordinates are dimensionless.

6. Determination of the Chromium and Manganese Content

The chromium and manganese contents were determined by ICP-MS. The detection limit of this method is 10 μg/kg.

7. Determination of the Chloride Content

The chloride content was determined by ion chromatography.

The invention is explained in more detail with reference to the following example which does not limit the scope of the invention.

EXAMPLE 108.6 1 of a yellow nucleant composition (BET specific surface 61 m$^2$/g. 72.7 g/l FeSO$_4$, 36.0 g/l α-FeOOH) were introduced into a stirred vessel fitted with a pH controller and an apparatus for sparging with air, 169 l of a pretreated iron(II) chloride solution containing 228.6 g/l FeCl$_2$ were pumped into this nucleant suspension. Sodium hydroxide solution [300 g/l] was then added at a rate such that the pH of the suspension rose by 0.2 units per hour. The batch was simultaneously oxidised with 80 l air per hour. The increase in pH was terminated when a pH of 3.85 was reached. This pH was held constant with sodium hydroxide solution. The sparging system remained in action. The reaction was terminated as soon as the Fe(II) content was less than 1 mole %.

The iron oxide yellow pigment obtained was filtered, washed with water, spray-dried and ground in a steam jet mill.

The product exhibited the following absolute colour properties and colour properties compared with Bayferrox 3905 (a product of Bayer AG), respectively: Measurement of strength of colour (when whitened with Bavertitan R-KB2):

| | |
|---|---|
| strength of colour: | 100% (reference : Bayferrox ® 3905 Standard 87) |
| delta a*: | 0.1 CIELAB units |
| delta b*: | −0.6 CIELAB units |

Absolute values:

| | |
|---|---|
| L*: | 82.1 CIELAB units |
| a*: | 4.2 CIELAB units |
| b*: | 38.0 CIELAB units |

Measurement of the strength of colour (as the full shade; reference: Bayferrox® 3905 Standard 87)

| | |
|---|---|
| delta L*: | −0.1 CIELAB units |
| delta a*: | −0.1 CIELAB units |
| delta b*: | −0.7 CIELAB units |

Absolute values:

| | |
|---|---|
| L*: | 63.4 CIELAB units |
| a*: | 9.0 CIELAB units |
| b*: | 48.9 CIELAB units |

Cr content: 10 mg/kg pigment
Mn content: 0.013 % with respect to the pigment
Cl content: 0.12% with respect to the pigment.

Comparative Example 108.6 l of a yellow nucleant composition (BET specific surface 61 m²/g. 72.7 g/l FeSO$_4$, 36.0 g/l α-FeOOH) were introduced into a stirred vessel fitted with a pH controller and an apparatus for sparging with air. 169 l of an iron(II) chloride solution, which had not been pretreated and which contained 228.6 g/l FeCl$_2$ were pumped into this nucleant suspension.

Sodium hydroxide solution [300 g/l] was then added at a rate such that the pH of the suspension rose by 0.2 units per hour. The batch was simultaneously oxidised with 80 l air per hour. The increase in pH was terminated when a pH of 3.85 was reached. This pH was held constant with sodium hydroxide solution. The sparging system remained in action. The reaction was terminated as soon as the Fe(II) content was less than 1 mole %.

The iron oxide yellow pigment obtained was filtered, washed with water, spray-dried and ground in a steam jet mill.

The product exhibited the following absolute colour properties and colour properties compared with Bayferrox® 3905 (a product of Bayer AG), respectively: Measurement of strength of colour (when whitened with Bayertitan R-KB2):

| | |
|---|---|
| strength of colour: | 100% (reference: Bayferrox ® 3905 Standard 87) |
| delta a*: | 0.1 CIELAB units |
| delta b*: | −0.4 CIELAB units |

Absolute values:

| | |
|---|---|
| L*: | 82.1 CIELAB units |
| a*: | 4.3 CIELAB units |
| b*: | 38.2 CIELAB units |

Measurement of the strength of colour (as the full shade; reference: Bayferrox 3905 Standard 87)

| | |
|---|---|
| delta L*: | −0.7 CIELAB units |
| delta a*: | −0.1 CIELAB units |
| delta b*: | −1.9 CIELAB units |

Absolute values:

| | |
|---|---|
| L*: | 62.7 CIELAB units |
| a*: | 9.1 CIELAB units |
| b*: | 47.7 CIELAB units |

Cr content: 180 mg/kg pigment
Mn content: 0.017 % with respect to the pigment
Cl content: 0. 12% with respect to the pigment.

What is claimed is:

1. An iron oxide yellow pigments having:
   a) for full shade, a lightness, L*, of 62.0 to 64.0 CIELAB units, an a* value of 8.5 to 10.5 CIELAB units, and a b* value of 48.5 to 50.5 CIELAB units;
   b) when whitened, a lightness, L* of 81.6 to 82.5 CIELAB units, an a* value of 3.8 to 4.8 CIELAB units, and a b* value of 37.5 to 39.5 CIELAB units; and
   c) based on pigment. 0.007 to 0.055 wt % Mn. 0.05 to 0.3, wt % Cl and less than 40 mg/kg Cr.

2. A process for producing iron oxide yellow pigment by precipitation comprising,
   a) intensively admixing sufficient amounts of an alkaline component to an acidic 50–450 g/l FeCl$_2$ solution to adjust the pH of the solution to between 3 and 5;
   b) optionally adding a flocculation aid to the FeCl$_2$ solution in step a) before, after or concurrent with the addition of the alkaline component;
   c) optionally exposing the solution in steps a) or b) to oxidation;
   d) separating the solid resulting from steps a), b) or c) from the solution;
   e) adding the solution from step d) to an α-FeOOH nuclei suspension produced by the precipitation process, in a quantity corresponding to 4 to 8 times the molar quantity of overall iron based on iron oxide hydroxide and unreacted iron compound in the nuclei suspension;
   f) heating the suspension formed in e) to 30 to 95° C. with thorough mixing;
   g) oxidizing the result of step f) by adding sufficient oxidizing agent to oxidize 0.5 to 10 moles % iron per hour while increasing the pH to a final pH of 3.0 to 5.0 by adding sufficient alkaline component to raise the pH at a rate of 0.01 to 0.4 pH units/hr;
   h) after step g), optionally continuing oxidation while maintaining the pH at a constant between 3.0 and 5.0;
   i) stopping the oxidation when the Fe (II) content of the suspension from step g) or h) is less than 1 mole %; and
   j) separating off, washing, drying and grinding the iron oxide yellow pigment from step i).

3. The process according to claim 2, wherein the temperature in step f) is 30 to 85° C.

4. The process according to claim 2, wherein the temperature in step f) is 55 to 75° C.

5. The process according to claim 2, wherein the rate of oxidation in step g) is 0.5 to 2.0 mole % per hour.

6. The process according to claim 2, wherein the alkaline component is selected from the group consisting of sodium hydroxide, sodium carbonate, magnesium carbonate, magnesium oxide, magnesium hydroxide, calcium oxide, calcium hydroxide and ammonia.

7. An iron oxide yellow pigment produced by the precipitation process comprising,
   a) intensively admixing sufficient amounts of an alkaline component to an acidic 50–450 g/l $FeCl_2$ solution to adjust the pH of the solution to between 3 and 5;
   b) optionally adding a flocculation aid to the $FeCl_2$ solution in step a) before, after or concurrent with the addition of the alkaline component;
   c) optionally exposing the solution in steps a) or b) to oxidation;
   d) separating the solid resulting from steps a), b) or c) from the solution;
   e) adding the solution from step d) to an $\alpha$-FeOOH nuclei suspension produced by the precipitation process, in a quantity corresponding to 4 to 8 times the molar quantity of overall iron based on iron oxide hydroxide and unreacted iron compound in the nuclei suspension;
   f) heating the suspension formed in e) to 30 to 95° C. with thorough mixing;
   g) oxidizing the result of step f) by adding sufficient oxidizing agent to oxidize 0.5 to 10 mole % iron per hour while increasing the pH to a final pH of 3.0 to 5.0 by adding sufficient alkaline component to raise the pH at a rate of 0.01 to 0.4 pH units/hr;
   h) after step g), optionally continuing oxidation while maintaining the pH at a constant between 3.0 and 5.0;
   i) stopping the oxidation when the Fe (II) content of the suspension from step g) or h) is less than 1 mole %; and
   j) separating off, washing, drying and grinding the iron oxide yellow pigment from step i).

8. A building material comprising the iron oxide yellow pigment according to claim 1.

9. A process to colour building material comprising adding the iron oxide yellow pigment according to claim 1 to the building material.

10. A paper or plastic material comprising the iron oxide yellow pigment according to claim 1.

11. A process to colour paper or plastic material comprising adding the iron oxide yellow pigment according to claim 1 to the paper or plastic material.

12. A paint or lacquer comprising the iron oxide yellow pigment according to claim 1.

13. A process to colour paint or lacquer comprising adding the iron oxide yellow pigment according to claim 1 to the paint or lacquer.

14. A colorant preparation comprising the iron oxide yellow pigment according to claim 1.

15. A process to produce a colorant preparation comprising adding the iron oxide yellow pigment according to claim 1 to the colorant preparation.

* * * * *